US005558442A

United States Patent [19]
Ng

[11] Patent Number: 5,558,442
[45] Date of Patent: Sep. 24, 1996

[54] LINEAR MOTION BEARING ASSEMBLY

[75] Inventor: Alison Ng, Jamaica, N.Y.

[73] Assignee: Thomson Industries, Inc., Port Washington, N.Y.

[21] Appl. No.: 582,043

[22] Filed: Jan. 2, 1996

Related U.S. Application Data

[63] Continuation of Ser. No. 239,996, May 9, 1994, abandoned, which is a continuation-in-part of Ser. No. 94,514, Jul. 20, 1993, Pat. No. 5,346,313.

[51] Int. Cl.⁶ .................................................. F16C 29/06
[52] U.S. Cl. ........................................................... 384/43
[58] Field of Search ............................................. 384/43

[56] References Cited

U.S. PATENT DOCUMENTS

| | | | |
|---|---|---|---|
| 3,512,849 | 5/1970 | Weisel | 384/43 |
| 3,545,826 | 12/1970 | Magee et al. | 384/43 |
| 3,692,371 | 9/1972 | Geffner | 384/43 |
| 3,767,276 | 10/1973 | Henn | 384/43 |
| 3,951,472 | 4/1976 | Schurger et al. | 384/43 |
| 3,967,865 | 7/1976 | Walter et al. | 384/43 |
| 3,975,064 | 8/1976 | Nilsson | 384/43 |
| 4,201,424 | 5/1980 | Ernst et al. | 384/43 |
| 4,227,751 | 10/1980 | Albert | 384/43 |
| 4,278,305 | 7/1981 | Olschewski et al. | 384/43 |
| 4,512,617 | 4/1985 | Saravis et al. | 384/43 |
| 4,717,264 | 1/1988 | Walter et al. | 384/43 |
| 4,789,249 | 12/1988 | Mutolo | 384/43 |
| 4,815,862 | 3/1989 | Mugglestone et al. | 384/43 |
| 4,952,075 | 8/1990 | Rogers, III | 384/43 |
| 5,046,862 | 9/1991 | Ng | 384/43 |
| 5,069,555 | 12/1991 | Mugglestone et al. | 384/43 |
| 5,145,260 | 9/1992 | Edelmann et al. | 384/43 |

Primary Examiner—Thomas R. Hannon
Attorney, Agent, or Firm—Dilworth & Barrese

[57] ABSTRACT

A linear motion bearing assembly is provided and includes ball retainer structure, outer housing sleeves, a plurality of load bearing plates and plate retainer structure. The ball retainer structure of the bearing assembly can be either monolithically formed or, alternatively, assembled from multiple elements. At least a portion of axial ball tracks are formed in the outer radial faces of the ball retainer structure with each ball track having a load bearing portion providing access to a support shaft or spline. An outer housing including a pair of sleeves are provided to encompass and protect the ball retainer structure and the bearing balls contained therein. These sleeves are preferably formed of an engineering plastic. A plurality of load bearing plates, preferably of the self-aligning type, are positioned within the outer housing and serve to receive and transmit loads from the bearing balls in the load bearing portion of the ball tracks. Separate plate retainer structure is configured and positioned to directly receive and transmit loads from the load bearing plates to a carriage into which the bearing assembly is mounted. This plate retainer structure may be extended longitudinally to substantially enclose the exterior surface of the ball retainer structure. In this configuration, no separate outer housing structure is needed.

23 Claims, 11 Drawing Sheets

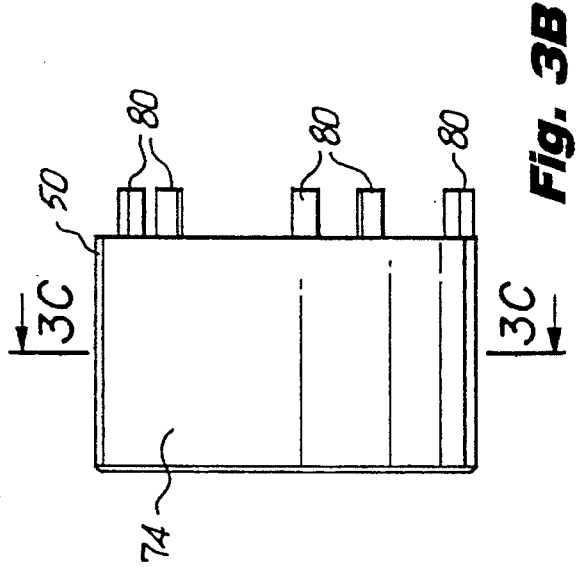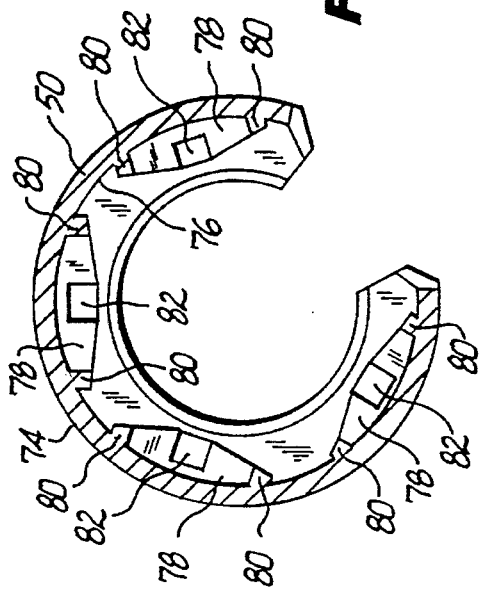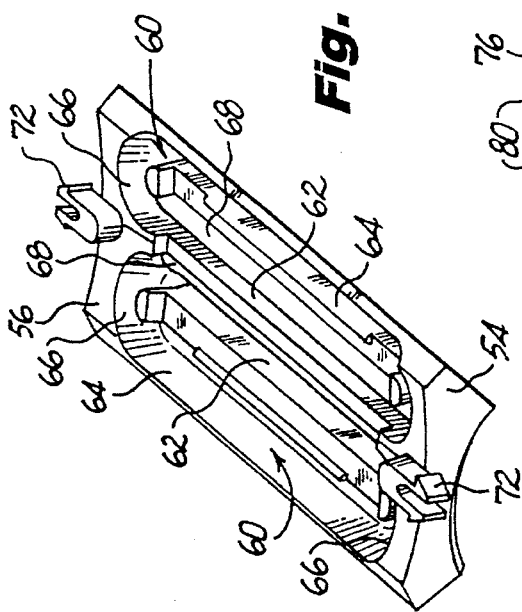

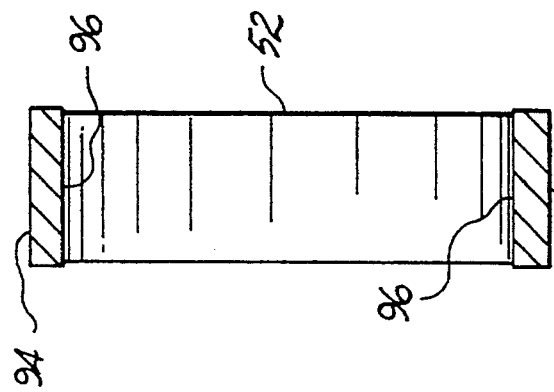
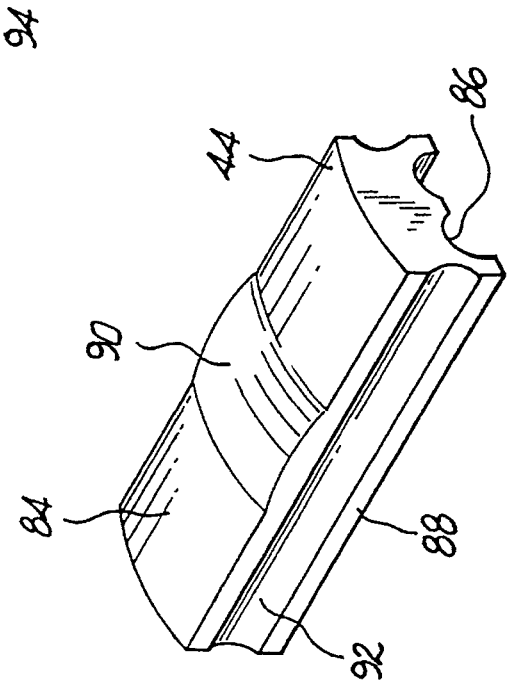
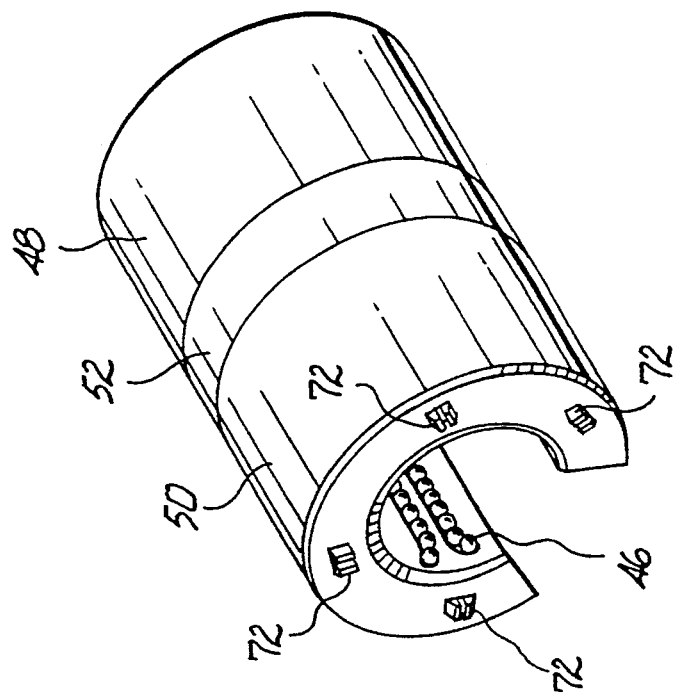

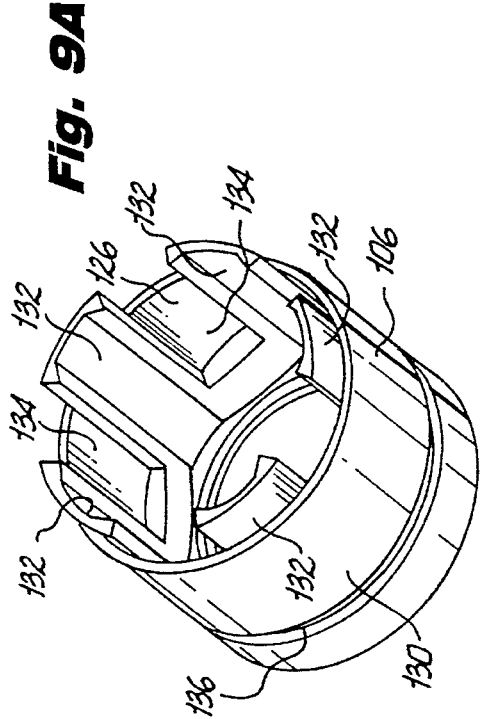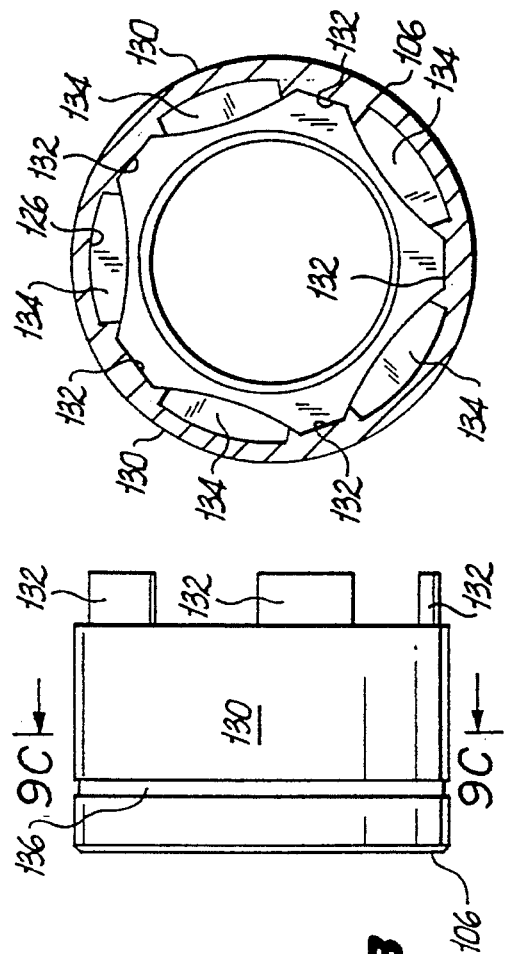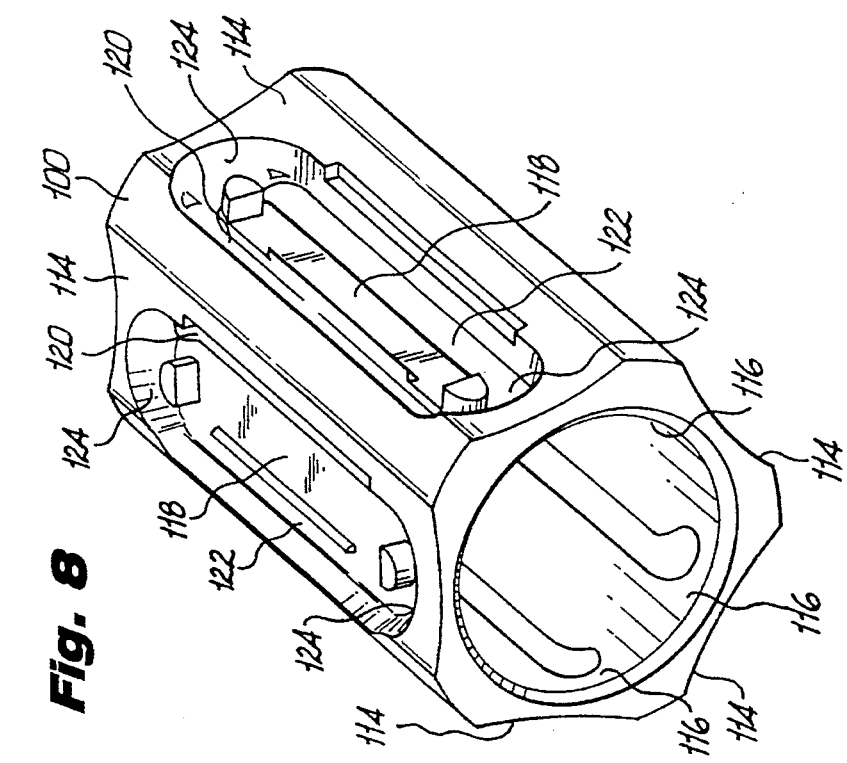

LINEAR MOTION BEARING ASSEMBLY

CROSS REFERENCE TO RELATED APPLICATIONS

This is a continuation of application Ser. No. 08/239,996 filed on May 9, 1994 now abandoned, which is a continuation-in-part of application Ser. No. 08/094,514, filed Jul. 20, 1993, U.S. Pat. No. 5,346,313.

FIELD OF THE INVENTION

The present invention relates to anti-friction linear motion bearing assemblies and, more particularly, to multiple track linear bearing assemblies for longitudinal movement along a shaft.

DESCRIPTION OF THE RELATED ART

The present invention is directed to improvements in linear motion bearing assemblies. In particular, the improvements relate to linear motion bearing assemblies of the type which support a carriage or pillow block for linear movement along a support member such as an elongated shaft or spline.

These bearing assemblies can either be of the open type or the closed type. Bearing assemblies contemplated by the present invention generally include an outer housing and a ball retainer dimensioned for insertion into the outer housing. The ball retainer defines a plurality of longitudinal planar faces each having at least one ball track in a loop configuration for containing and recirculating bearing balls. The ball tracks include open portions which facilitate load transfer from the supporting shaft to load bearing structure such as load bearing plates operatively associated with either the ball retainer or the outer housing. Return portions of the ball tracks permit continuous recirculation of the bearing balls through the ball tracks during linear motion. The ball retainer is typically formed as a monolithic element with the ball tracks integrally incorporated therein. See, U.S. Pat. No. 3,767,276 to Henn. This structure, however, is difficult to efficiently manufacture because of the complex molds required. Also, these ball retainers, prior to insertion into a mounting carriage or outer housing are necessarily open and thus exposed to ambient conditions and contaminants such as dust and dirt. Such exposure could deleteriously affect the operation and life of the bearing assembly as well as the support structure on which it moves.

The load bearing structure may be in the form of integral elements formed on an inner radial surface of the outer housing. Typical bearing assemblies utilizing load bearing structure formed in the outer housing are shown, for example, in commonly owned U.S. Pat. No. 5,046,862 to Ng, the disclosure of which is incorporated herein by reference.

In lieu of integral load bearing structure, separate load bearing plates may be utilized to transfer loads from the supporting shaft. These load bearing plates are longitudinally oriented in association with the ball retainer so as to engage at least those bearing balls in direct contact with the support shaft. These load bearing plates may also be configured to be axially self-aligning by providing structure which permits the plates to rock into and out of parallelism with the longitudinal axis of the ball retainer. See, for example, commonly owned U.S. Pat. No. 3,545,826 to Magee et al. Individual load bearing plates may be expanded transversely so as to engage bearing balls in corresponding adjacent load bearing tracks. In this form, parallel grooves are formed in the underside of the plates to guide the bearing balls while they are in the load bearing portion of the ball tracks. See, for example, U.S. Pat. No. 3,951,472 to Schurger et al.

The outer housing of bearing assemblies of the type contemplated by the present invention are typically in the form of a one piece hollow steel cylinder which serves to, inter alia, retain and protect the ball retainer and balls. See, for example, U.S. Pat. Nos. 5,046,862 to Ng and 3,767,276 to Henn, discussed above. While useful, this type of outer housing greatly increases the weight and expense of the bearing assembly. Further, the incorporation of load bearing structure in the interior side walls of the outer housing requires elaborate and precise machining to accomplish.

Accordingly, it is one object of the present invention to provide a linear motion bearing assembly which can be easily and efficiently manufactured.

It is another object of the present invention to provide a linear motion bearing assembly having a ball retainer and outer housing which are easily fabricated using engineering plastics.

It is a further object of the present invention to provide a low cost linear motion bearing assembly having high load bearing capacity and having self-aligning capability.

It is another object of the present invention to provide a simple and efficient fabrication and assembly process for a linear motion bearing assembly.

These and other highly desirable objects are accomplished by the present invention in a linear motion bearing assembly having a plurality of ball tracks and individual bearing plates arranged in a ball retainer and enclosed by a low cost outer housing which serves to protect the balls, ball tracks and load bearing plates without having to transmit loads from the bearing balls to the carriage block into which the bearing assembly is mounted.

In an alternate embodiment, the outer housing is replaced with an elongated, substantially cylindrical extended plate retainer structure which not only serves to protect the balls, ball tracks and load bearing plates, but also encloses the outer radial surface of the ball retainer and load bearing plates and transmits loads directly to the bearing carriage from the load bearing plates.

Objects and advantages of the invention are set forth in part herein and in part will be obvious therefrom, or may be learned by practice with the invention, which is realized and attained by means of instrumentalities and combinations pointed out in the appended claims. The invention comprises the novel parts, constructions, arrangements, combinations, steps, processes and improvements herein shown and described.

SUMMARY OF THE INVENTION

Accordingly, the present invention provides a linear motion bearing assembly for movement along a shaft. The ball retainer structure of the bearing assembly can be either monolithically formed or, alternatively, assembled from multiple elements. Preferably, the multiple elements are all identical and can be assembled to a variety of configurations for either open-type bearing assemblies or closed-type bearing assemblies. At least a portion of the axial ball tracks are formed in the ball retainer structure and, preferably, the complete ball tracks are formed therein. The linear motion bearing assembly further includes an outer housing having a pair of sleeves which substantially enclose all of the ball retainer structure. These sleeves are preferably formed of an engineering plastic and serve to protect the ball retainer and bearing balls contained therein from ambient contamination.

A plurality of load bearing plates are axially positioned within the outer housing and serve to receive and transmit loads from the bearing balls in the load bearing portion of the ball tracks. The load bearing plates are at least partially retained in the linear motion bearing assembly by plate retainer structure which is disposed at least partially around the ball retainer and in contact with an outer radial surface of the load bearing plates. The plate retainer structure is preferably in the form of a plate retainer ring and is configured and positioned to directly receive and transmit loads from the load bearing plates to a carriage into which the linear bearing assembly is mounted.

Preferably, the load bearing plates and/or the plate retainer structure are configured and dimensioned such that the linear motion bearing assembly is substantially self-aligning on the shaft. It is also preferred that the load bearing plates and/or the plate retainer structure be configured to effect both axial and circumferential self-alignment of the linear motion bearing assembly on the shaft.

In an alternate embodiment, the plate retainer structure effectively extends substantially the entire longitudinal length of the bearing assembly and obviates the need for the sleeve structure altogether. In this configuration, the load bearing plates are in direct contact with the extended plate retainer structure and, as in the above embodiment, this structure serves to receive and transmit loads from the outer radial surface of the load bearing plates to the carriage structure. Instead of the sleeve structure, the extended plate retainer structure directly retains the ball retainer structure, balls and the load bearing plates. End containment elements, such as, for example, snap rings or C-rings are positioned at either longitudinal end of the extended plate retainer structure to enclose and hold the ball retainer structure therein. Optionally, end seals may be positioned on the longitudinal ends to protect the bearing assembly from ambient contamination.

The present invention also provides a novel and efficient assembly process for linear motion bearing assemblies. This process includes the steps of assembling a ball retainer segment sub-assembly by loading balls into the ball tracks and positioning a load bearing plate in position adjacent the load bearing tracks. Thereafter, end containment structure is positioned in one end of the extended plate retainer structure and a central fixture is at least partially inserted into a central portion of the extended plate retainer structure to facilitate accurate placement of ball retainer segment sub-assemblies. Once all of the ball retainer segment sub-assemblies are in place within the extended plate retainer structure, the fully assembled bearing assembly can be removed from the central fixture.

BRIEF DESCRIPTION OF THE DRAWINGS

The accompanying drawings, referred to herein and constituting a part hereof, illustrate the preferred embodiments of the bearing assembly of the present invention and, together with the description, serve to explain the principles of the invention.

FIG. 2 is a perspective view of a ball retainer segment in accordance with the linear motion bearing assembly of FIG. 1.

FIG. 3 is a perspective view of the sleeve portion of the outer housing of the linear motion bearing assembly of FIG. 1.

FIG. 3B is a side view of the sleeve portion of FIG. 3A.

FIG. 3C is a cross-sectional view taken along line 3C—3C in FIG. 3B of the sleeve portion of FIG. 3A.

FIG. 4 is a perspective view of the load bearing plate in accordance with the linear motion bearing assembly of FIG. 1.

FIG. 5 is a cross-sectional view of the plate retainer ring taken along line 5—5 of FIG. 1.

FIG. 6 is a perspective view of the assembled linear motion bearing assembly of FIG. 1.

FIG. 8 is a perspective view of a monolithic ball retainer segment in accordance with the linear motion bearing assembly of FIG. 7.

FIG. 9A is a perspective view of the sleeve portion of the outer housing of the linear motion bearing assembly of FIG. 7.

FIG. 9B is a side view of the sleeve portion of FIG. 9A.

FIG. 9C is a cross-sectional view taken along line 9C—C of FIG. 9B of the sleeve portion of FIG. 9A.

FIG. 16 is a perspective view of a monolithic ball retainer structure for use with the linear motion bearing assembly of FIG. 13.

DETAILED DESCRIPTION OF PREFERRED EMBODIMENTS

Figure 1:
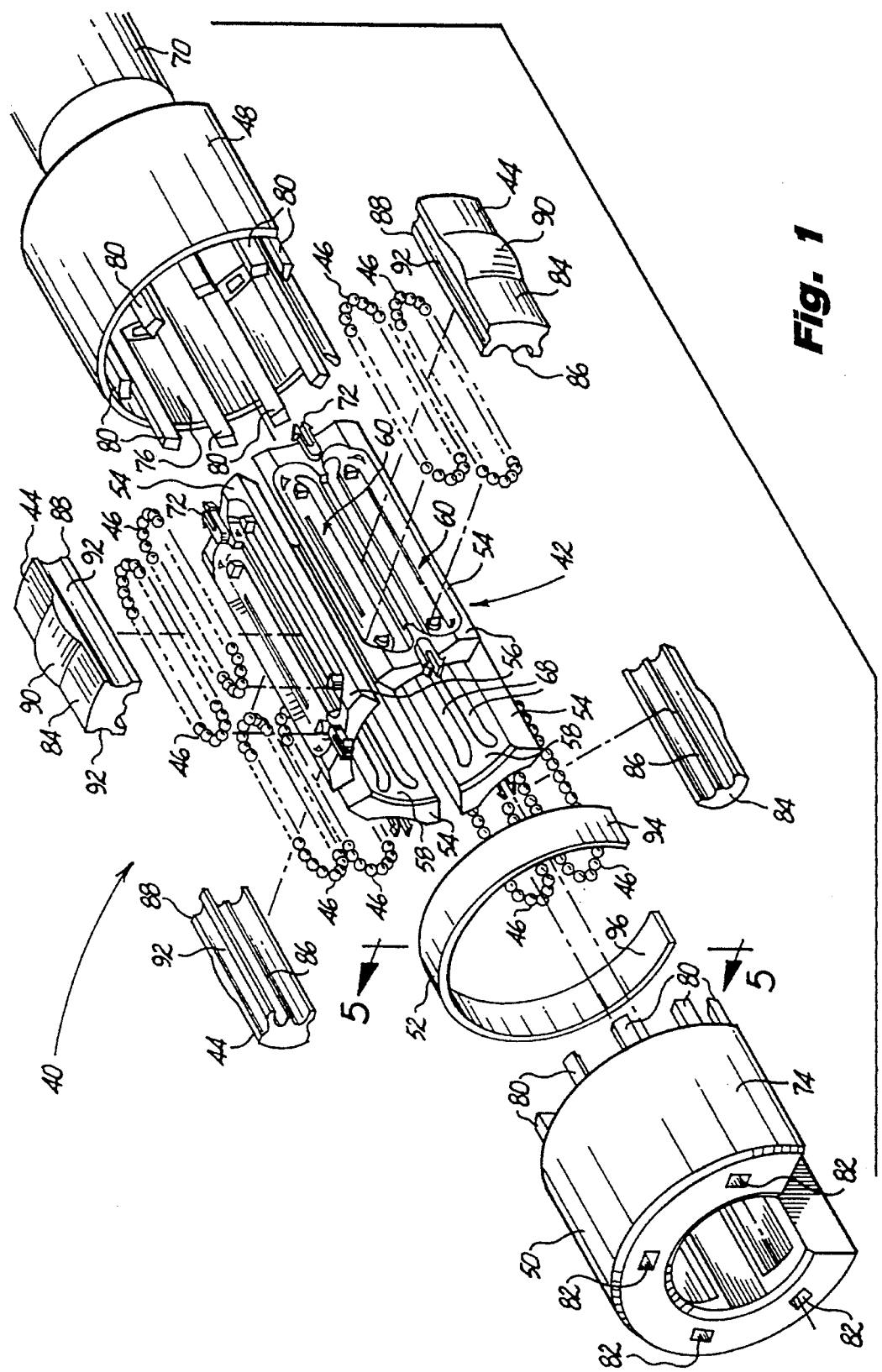
FIG. 1 is an exploded perspective view of a linear motion bearing assembly in accordance with one embodiment of the present invention.

Referring initially to FIGS. 1–6, there is shown a linear motion open-type bearing assembly 40 in accordance with a preferred embodiment of the present invention. The bearing assembly includes ball retainer structure, shown generally at 42, load bearing plates 44, bearing balls 46, outer housing sleeves 48, 50 and plate retainer structure 52.

In FIGS. 1–2 details of the ball retainer structure 42 are illustrated. In this embodiment of the present invention the ball retainer structure 42 comprises four ball retainer segments 54, each operatively associated with adjacent ball retainer segments along longitudinal sides thereof to form a pentagonally shaped ball retainer structure having a bore therethrough for receiving a shaft 70. Each ball retainer segment 54 includes an outer radial surface 56 and an inner radial surface 58. Axial ball tracks 60 are formed in the outer radial surface 56 of each ball retainer segment 54 and include load bearing portions 62, return portions 64 and turnarounds 66. The load bearing and return portions of the ball tracks in this embodiment are undercut to facilitate loading and retention of the bearing balls 46 therein. This also eliminates the need for separate retainer structure to keep the bearing balls in the ball tracks. A longitudinal bore 68 in the inner radial surface 58 of the ball retainer segment 54 extends substantially the length of the load bearing portions 62 and accesses support shaft 70. Although support shaft 70 is illustrated as a substantially cylindrical shaft, one skilled in the art will appreciate that support members of other configurations are within the scope of the invention.

In this embodiment of the linear motion bearing assembly 40, the individual ball retainer segments 54 are easily molded from an appropriate engineering plastic using known materials and molding techniques. By individually forming each of the ball retainer segments, the molding process is greatly simplified and thus results in a lower cost to produce. It is also within the scope of the present invention to fabricate the ball bearing segments from an engineering metal using known fabrication techniques.

A plurality of bearing balls 46 are disposed in the ball tracks 60 with those bearing balls 46 in the load bearing tracks 62 extending at least partially into longitudinal bores 68 to contact support shaft 70. In this embodiment of the invention, a pair of axial ball tracks 60 are formed in each outer radial surface 56 of the ball retainer segment with the corresponding load bearing tracks being oriented in substantially parallel adjacent relation. This orientation facilitates enhanced load capacity and maximizes space utilization for a more compact and efficient bearing ball arrangement. Locking structure in the form of locking clips 72 are formed on opposing longitudinal ends of each ball retainer segment 54 to facilitate assembly with outer housing sleeves 48, 50, discussed in greater detail hereinbelow.

Referring now to FIGS. 1 and 3A–C, the linear motion bearing assembly in accordance with one preferred embodiment includes a pair of outer housing sleeves 48, 50 which, when assembled serve to close and protect the exposed outer radial surfaces 56 of ball retainer structure 42. Preferably, each of sleeves 48, 50 are identical in configuration and are molded from an engineering plastic to facilitate ease of manufacture and assembly. However, one skilled in the art will appreciate that, when operating conditions or specific applications require, the sleeves may be made in differing configurations and/or from engineering metals.

The outer radial surface 74 of sleeves 48, 50 are preferably of a smooth cylindrical shape and are configured and dimensioned to fit within a mounting bore of a tool carriage (not shown). The inner radial surface 76 of sleeves 48, 50 include mounting surfaces 78 which are configured to receive at least a portion of load bearing plates 44 therein. These mounting surfaces 78 further include extension portions 80 which define a mounting space for plate retainer structure 52, described in greater detail below. Preferably, mounting surfaces 78 are recessed from outer radial surface 74 by a distance approximating the cross-sectional thickness of plate retainer structure 52. In this manner, the outer housing sleeves 48, 50 and the plate retainer structure 52 combine to form a relatively smooth and uniform outer radial surface of the linear motion bearing assembly 40. See, FIG. 6.

In this embodiment of the present invention, mounting surfaces 78 are configured to fit the shape of individual ball retainer segments 54. A plurality of locking bores 82 are formed in respective ends of sleeves 48, 50 in alignment with locking clips 72 of ball retainer segments 54. Thus, when the ball retainer segments 54 are assembled into the sleeves 48, 50, locking clip 72 extends into respective locking bores 82 and assists in holding linear motion bearing assembly 40 together.

Referring now to FIGS. 1 and 4, a plurality of individual load bearing plates 44 are incorporated into the linear motion bearing assembly 40 and serve to receive load from the bearing balls 46 in contact with shaft 70. In the embodiment of FIG. 4, load bearing plate 44 is elongated along the longitudinal axis of the bearing assembly and includes an outer radial surface 84, an inner radial surface 86, and a pair of side wall surfaces 88. The outer radial surface 84 is substantially arcuate and, in a preferred embodiment, includes a crown portion 90 disposed on the outer radial surface 84 in a medial position. Crown portion 90 is configured and dimensioned to permit the load bearing plates to rock both circumferentially and longitudinally into and out of parallelism with the axes of the ball retainer 42.

The inner radial surface 86 of the load bearing plate of this embodiment is advantageously provided with a pair of axial grooves which serve as the upper surface of load bearing portions 62 of ball tracks 60. By providing a single load bearing plate 44 for each pair of load bearing portions 62 in each outer radial surface 56, the linear motion bearing assembly 40 is easier to fabricate and assemble. Further, the bearing assembly has a high load bearing capacity.

In this embodiment of the present invention, a longitudinal groove 92 is formed in each side wall surface 88 of load bearing plates 44. These grooves 92 make up a side wall of the axial ball tracks 60 and guide bearing balls 46 as they move through the return portion thereof.

Referring now to FIGS. 1, 5 and 6, plate retaining structure 52 is illustrated in a C-ring configuration having an outer radial surface 94 conforming substantially in dimension to the outer radial surface 74 of sleeves 48, 50. In this embodiment of the invention, the inner radial surface 96 is substantially parallel to the outer radial surface and is configured and dimensioned, when assembled, to contact crown portion 90 of load bearing plates 44. The radius of curvature of the crown portion 90 in the transverse direction is preferably smaller than the radius of curvature of the inner radial surface of the plate retainer structure 52. This configuration allows the plates to rock circumferentially with respect to the inner surface of the plate retainer structure 52.

Further, referring to FIGS. 1 and 6, the plate retaining structure 52 encompasses and engages extension portions 80 of sleeve 48, 50 to assist in enclosing and protecting ball retainer structure 42. Although shown in a narrow width, it is contemplated that the plate retaining structure 52 may extend substantially the entire longitudinal length of the bearing assembly, as discussed herein below. The plate retaining structure is preferably formed of a hard abrasion resistant material such as, for example, stainless steel or ceramic. Alternatively, a softer material such as bronze or aluminum may also be used.

When the inner radial surface 96 is positioned in contact with the crown portion 90 of the load bearing plates 44, this structure acts as the primary conduit for load from the load bearing plates and transmits that load directly to the carriage (not shown) into which the bearing assembly is mounted. This configuration permits sleeves 48, 50 to be relieved from primary load bearing responsibility and can thus be fabricated from less expensive and lighter engineering plastics such as, for example, acetal or nylon. This arrangement of elements also facilitates ease of manufacture and assembly resulting in an inexpensive, highly efficient, high load capacity bearing assembly.

It is also envisioned that various seals and/or wiper structure will be incorporated into the bearing assembly to inhibit the ingress of dust, dirt or other contaminants. See, for example, U.S. Pat. No. 3,545,826 to Magee et al., the disclosure of which is incorporated herein by reference.

FIGS. 7-11 illustrate a second preferred embodiment of a linear motion bearing assembly, shown generally at 98, in accordance with the present invention. Although shown as a closed-type bearing assembly, one skilled in the art will readily appreciate that the features of this bearing assembly are equally applicable to open-type bearing assemblies. The linear motion bearing assembly 98 includes a monolithic ball plate retainer structure 100, load bearing plates 102, bearing balls 104, outer housing sleeves 106, 108 and retainer structure 110.

Figure 7:
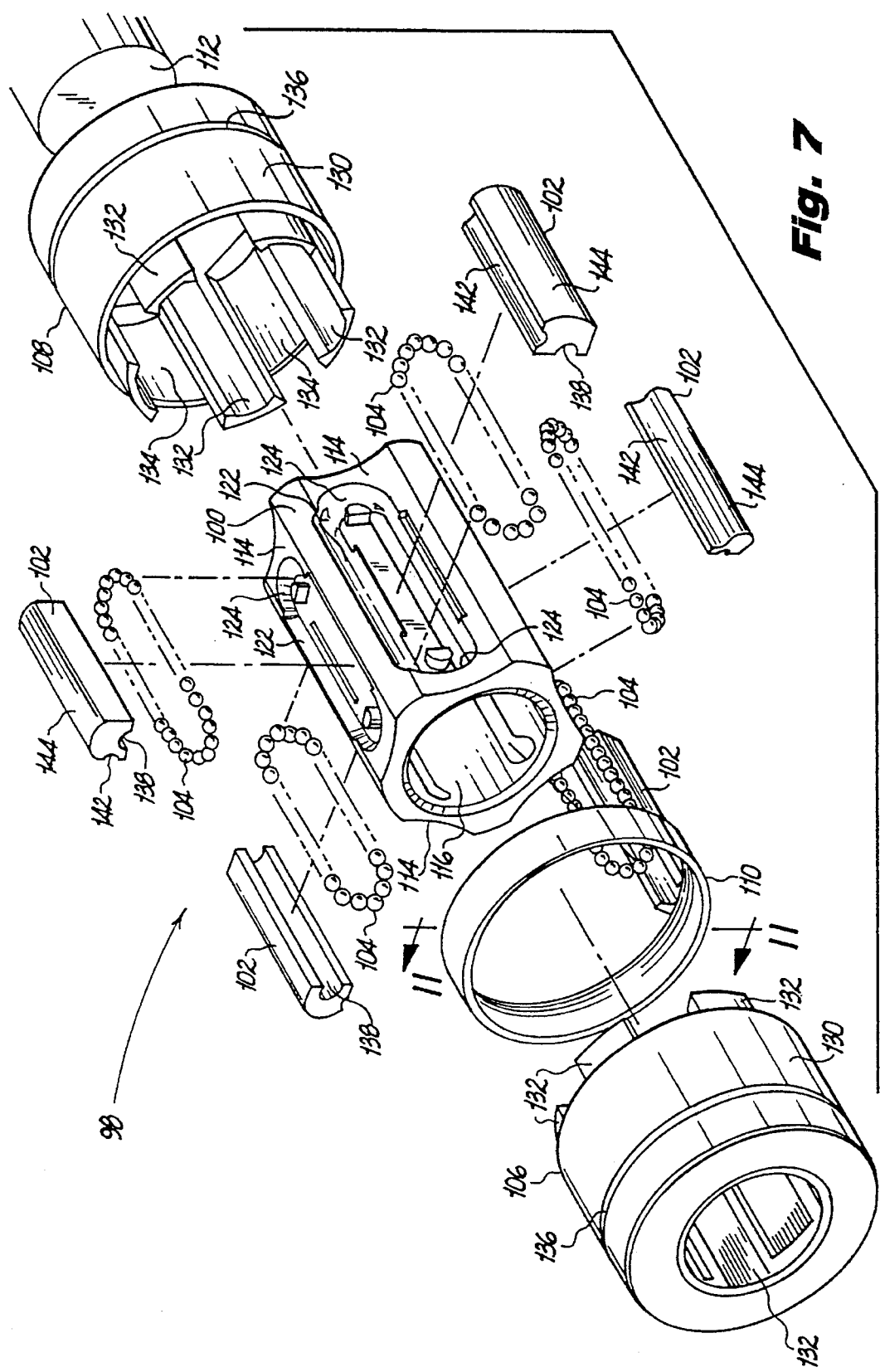
FIG. 7 is an exploded perspective view of a linear motion bearing assembly in accordance with another embodiment of the present invention.

Referring now to FIGS. 7-8, the ball retainer structure 100 in accordance with the present invention comprises a monolithic structure having a pentagonal cross-section and defining an axial bore therethrough configured and dimensioned to receive shaft 112. The ball retainer structure 100 includes five planar faces, each having an outer radial surface 114 and an inner radial surface 116. A single axial ball track 118 is formed in each of the five faces. Each ball track 118 includes a load bearing portion 120, a return portion 122 and a pair of turnarounds 124. The outer radial surface 114 is preferably shaped to conform to the inner radial surface 126 of outer housing sleeves 106, 108. A longitudinal channel 128 extends through the inner radial surface 116 of the load bearing portion 120 to permit bearing balls 104 therein access to shaft 112. Both the load bearing portions 120 and the return portions 122 of the ball tracks of this embodiment of the present invention are substantially open to facilitate loading of the bearing balls 104 therein.

FIGS. 7 and 9A–C show the outer housing sleeves 106, 108 in accordance with this embodiment of the present invention. As in the previously described embodiment, it is preferable that both sleeves be identical to facilitate manufacture and assembly. Sleeves 106, 108 include an inner radial surface 126 and an outer radial surface 130. Because axial ball tracks 118 are open, as opposed to undercut, upper ball track housing structure 132 is formed in the inner radial surface 126 of sleeves 106, 108. This upper ball track housing structure 132 forms an outer radial portion of the ball tracks and serves to better guide bearing balls 104 between load bearing and return portions, 120 and 122 respectively. Upper ball track housing structure 132 preferably extends axially beyond sleeves 106, 102 and is recessed from the outer radial surface 130 thereof to permit emplacement of plate retaining structure 110 discussed in detail below.

In this embodiment, cavities 134 are formed between said upper ball track housing structures 132 and configured and dimensioned to receive at least an outer radial portion of the load bearing plates 102. As in the previous embodiment, preferably each sleeve 106, 108 is monolithically formed from an engineering plastic to facilitate ease of manufacture and assembly. Where desirable, an annular groove 136 may be formed in the outer radial surface 130 of the sleeves 106, 108 to assist in mounting in carriage structure. Other known methods of mounting the bearing assembly in a carriage structure are also contemplated and include, for example, bolts, clips, pins, etc.

Figure 10:
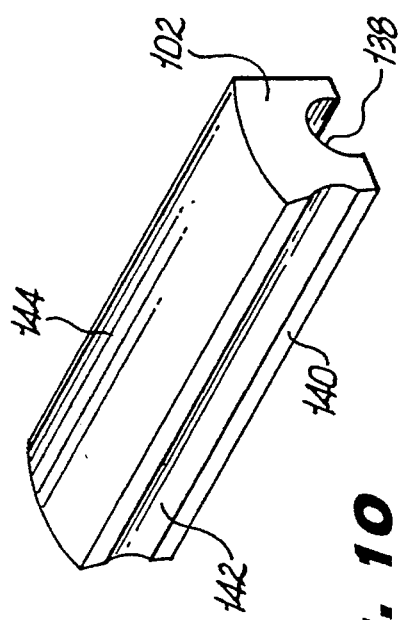
FIG. 10 is a perspective view of the load bearing plate in accordance with the linear motion bearing assembly of FIG. 7.

Referring now to FIGS. 7 and 10, load bearing plates 102 in accordance with this embodiment of the present invention are positionable between ball retainer 100 and outer housing sleeves 106, 108 in cavities 134. These load bearing plates 102 include a single longitudinal groove 138 formed on an inner radial surface thereof for contacting and guiding bearing balls 104 in the load bearing portions 120 of ball tracks 118. A side wall 140 of the load bearing plate 102 also includes a longitudinal groove 142 for guiding the bearing balls 104 in the return portion 122 of the ball tracks 118. The outer radial surface 144 of the load bearing plate 102 has a substantially smooth arcuate configuration to facilitate both axial and circumferential self alignment as will be described in greater detail hereinbelow.

Figure 11:
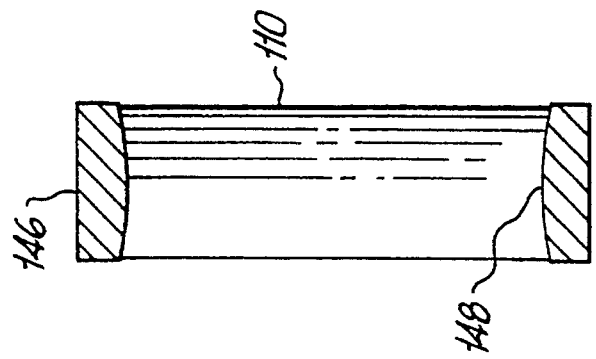
FIG. 11 is a cross-sectional view of the plate retainer ring taken along line 11—11 of FIG. 7.
Figure 12:
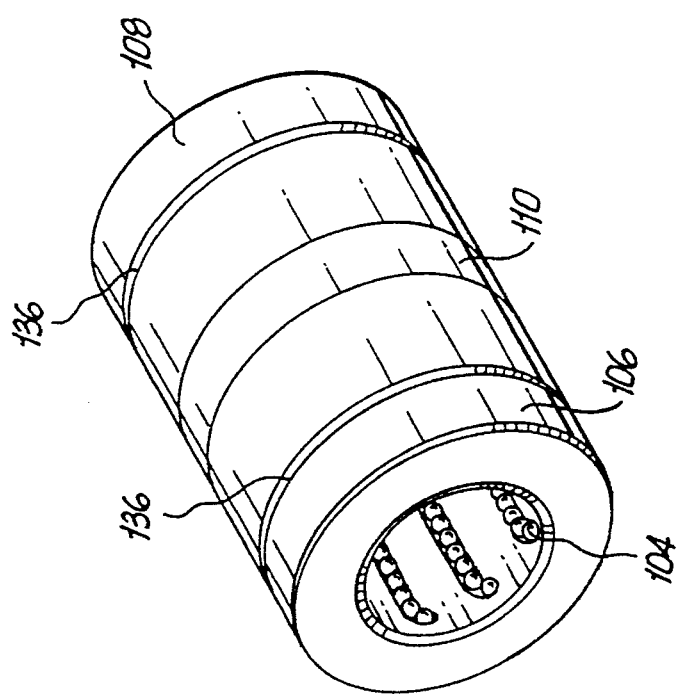
FIG. 12 is a perspective view of the assembled linear motion bearing assembly of FIG. 7.

Plate retaining structure 110 is illustrated in FIGS. 7, 11 and 12, and is shown as a generally closed ring configuration having an outer radial surface 146 conforming substantially in dimension to the outer radial surface 130 of sleeves 106, 108. The inner radial surface 148 is substantially convex when viewed in cross-section (FIG. 11) relative to the outer radial surface 146. This inner radial surface 148 is configured and dimensioned to contact the arcuate outer radial surface 144 of load bearing plates 102 when the linear motion bearing is assembled. The radius of curvature of the arcuate outer radial surface 144 of the load bearing plates 102 is preferably smaller than the radius of curvature of the inner radial surface 148 of the plate retainer structure 110. This configuration results in a contact between the arcuate outer radial surface 144 and the inner radial surface 148. This point-to-point contact permits both circumferential and axial self alignment of the bearing assembly when positioned on the shaft 112. The width of the plate retainer structure 110 is dimensioned to encompass and engage the portions of housing structure 132 extending from sleeves 106, 108 to assist in enclosing and protecting the exposed portion of ball retainer structure 110. As in the previous embodiment, the plate retainer structure 100 is preferably formed of a hard abrasion resistant material. This facilitates the transfer of load from the load bearing plates directly to the carriage without the need for a heavy cast or forged outer housing.

Referring now to FIGS. 13–18, a closed-type linear motion bearing assembly 200 is shown incorporating an extended plate retainer structure 202 to replace the housing sections 48, 50 of the previous embodiments. The bearing assembly 200 includes a pentagonal ball retainer assembly 204 made up of five individual ball retainer elements 206. (FIG. 15) Alternatively, as shown in FIG. 16, the pentagonal ball retainer assembly 204 may be monolithically formed. A pair of ball tracks 208 are formed in each outer surface of ball retainer element 206 and comprise load bearing tracks 210 and return tracks 212 joined by turnarounds 214. Preferably, both the return tracks 212 and turnarounds 214 are undercut to facilitate maintenance of the balls 216 therein. In this embodiment, the load bearing tracks 210 of each of the ball tracks 208 are situated adjacent one another. A plurality of balls 216 are disposed in the ball tracks 208 and facilitate movement of the linear motion bearing assembly 200 along rail 218.

Figure 13:
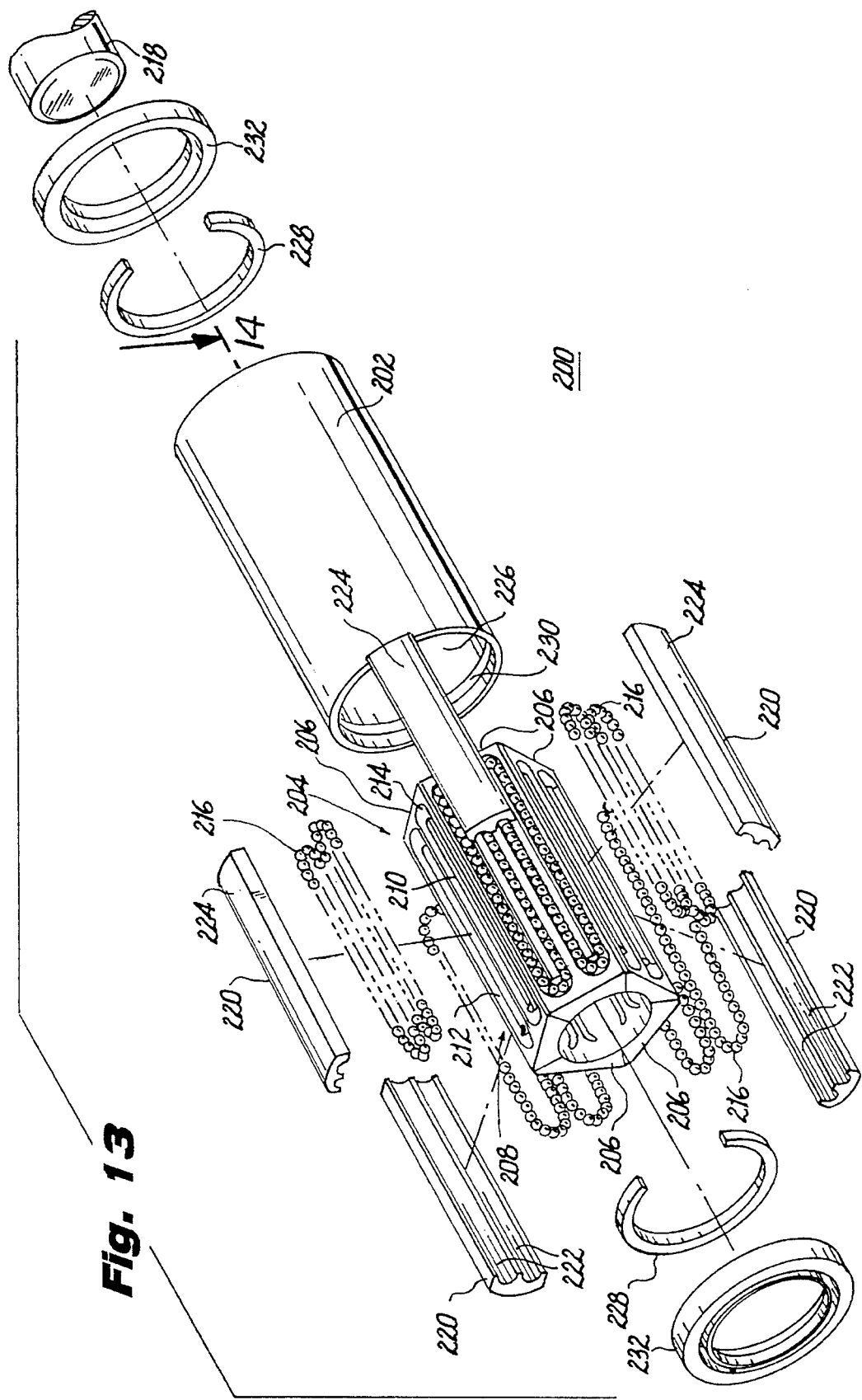
FIG. 13 is an exploded perspective view of a closed-type linear motion bearing assembly in accordance with another preferred embodiment of the present invention.
Figure 15:
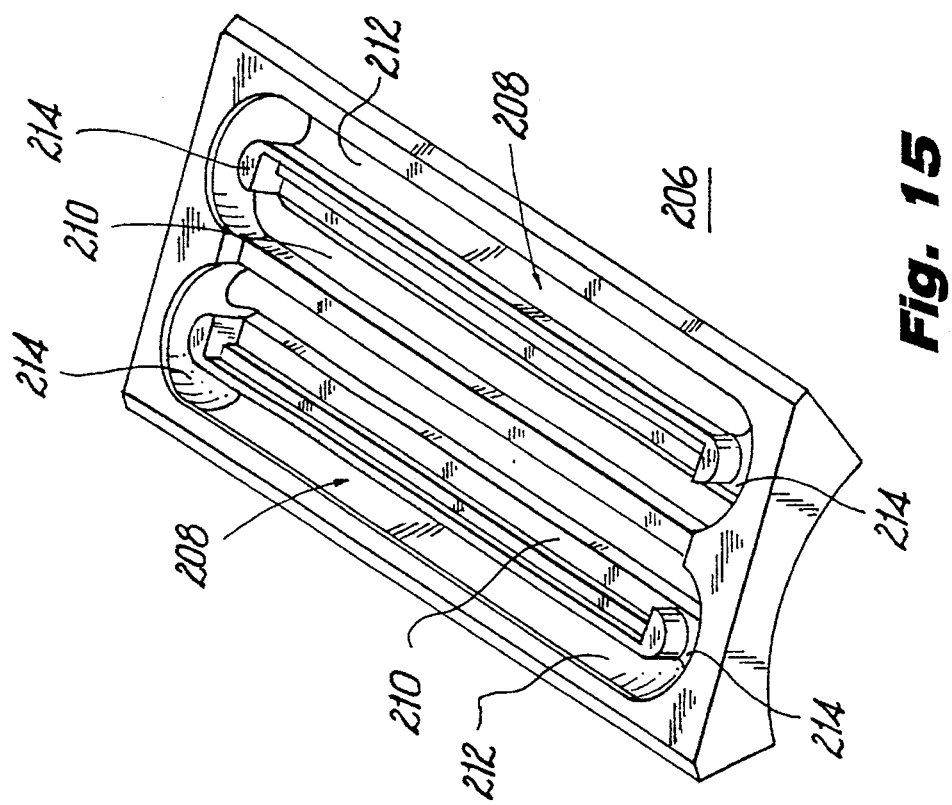
FIG. 15 is a perspective view of a ball retainer segment in accordance with the linear motion bearing assembly of FIG. 13.
Figure 14:
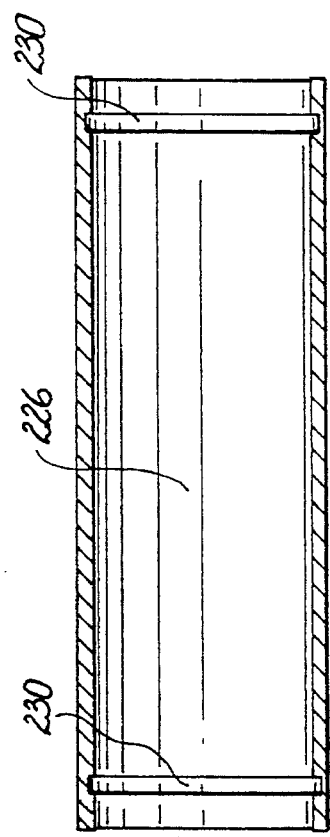
FIG. 14 is a longitudinal cross-sectional view of the extended plate retainer structure in accordance with the linear motion bearing assembly of FIG. 13.
Figure 17:
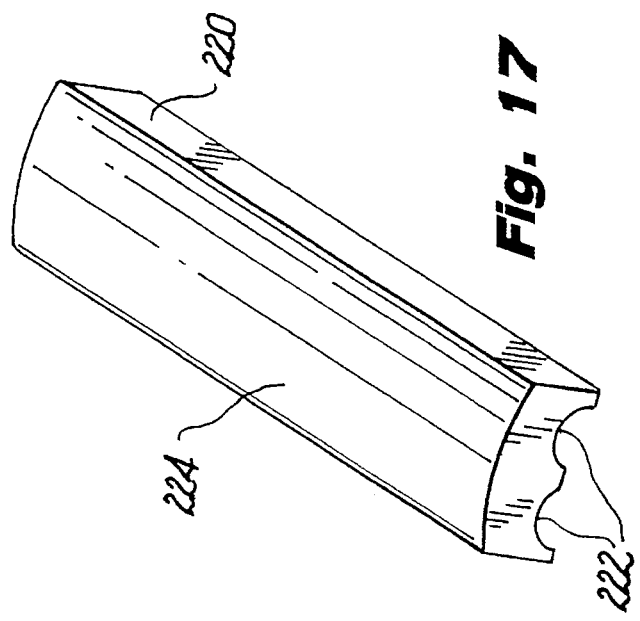
FIG. 17 is a perspective view of a load bearing plate in accordance with the linear motion bearing assembly of FIG. 13.
Figure 18:
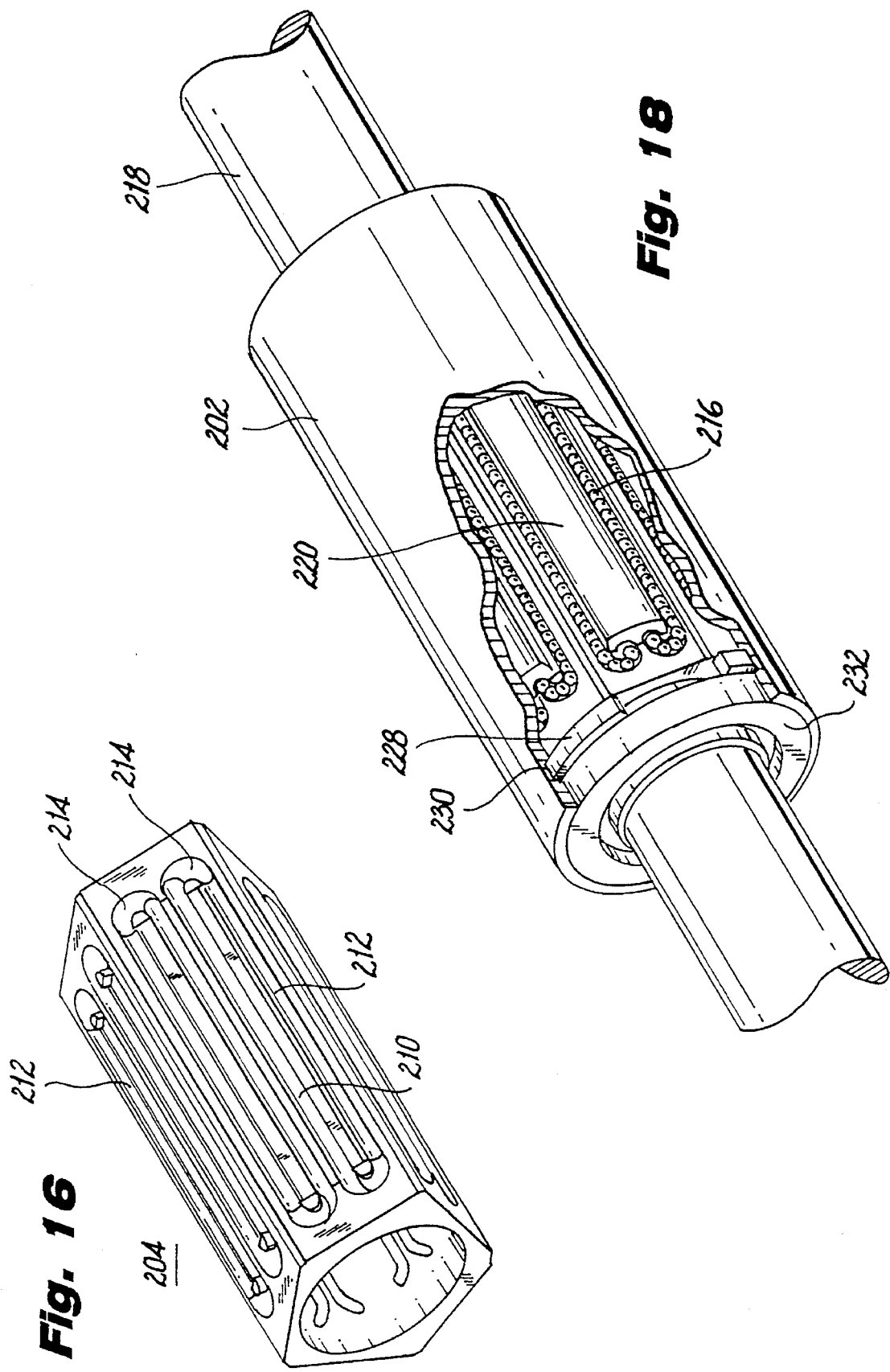
FIG. 18 is a perspective view in partial cross-section of the linear motion bearing assembly of FIG. 13 in an assembled configuration.

Referring now to FIGS. 13 and 17, the linear motion bearing assembly 200 includes a plurality of longitudinally extending load bearing plates 220. A pair of parallel axial grooves 222 are formed in an inner surface of the load bearing plates 220 and serve as the outer portion of the load bearing tracks 210. In operation, when balls 216 are disposed in the load bearing tracks 210, load is transmitted from rail 218 through balls 216 to load bearing plates 220. The outer surface 224 of the load bearing plates 220 is substantially uniform along its longitudinal length and has a radius of curvature which corresponds essentially to the radius of curvature of the inner surface 226 of the extended plate retainer structure 202. This configuration maximizes the contact between the outer surface 224 of the load bearing plates 220 and the inner surface 226 of the extended ball retainer structure 202, thus increasing the efficiency and load transfer of the linear motion bearing assembly 200.

The pentagonal ball retainer assembly 204 is held in place within the extended plate retainer structure by end containment elements 228. In this embodiment the end containment elements include C-Rings which snap fit into transverse channels 230 formed in the inner surface 226 of the extended ball retainer structure 202 adjacent each longitudinal end. (FIG. 14) One skilled in the art will readily appreciate that other structure may be used with equal effect including friction fit end caps, or rounding the edges of the longitudinal ends of the extended plate retainer structure to form a flange to hold in the ball retainer assembly. Also, where desired, seals 232 may be incorporated into the linear motion bearing assembly 200 to protect the balls 216 and ball tracks 208 from ambient contamination.

The extended plate retainer structure 202 is preferably in the form of an open hollow cylinder having substantially uniform inner surface 226. This extended plate retainer structure extends longitudinally to cover and enclose (FIG. 18) the pentagonal ball retainer assembly 204, the balls 216 and the load bearing plates 220. In addition, the extended plate retainer structure 202 serves to transmit loads from the outer surface 224 of the load bearing plates 220 to the carriage (not shown) in which the linear motion bearing assembly 200 is to be mounted. In this embodiment, the extended plate retaining structure is formed of aluminum. However, other materials are also envisioned including steel, bronze, plastic, brass, etc.

Figure 19:
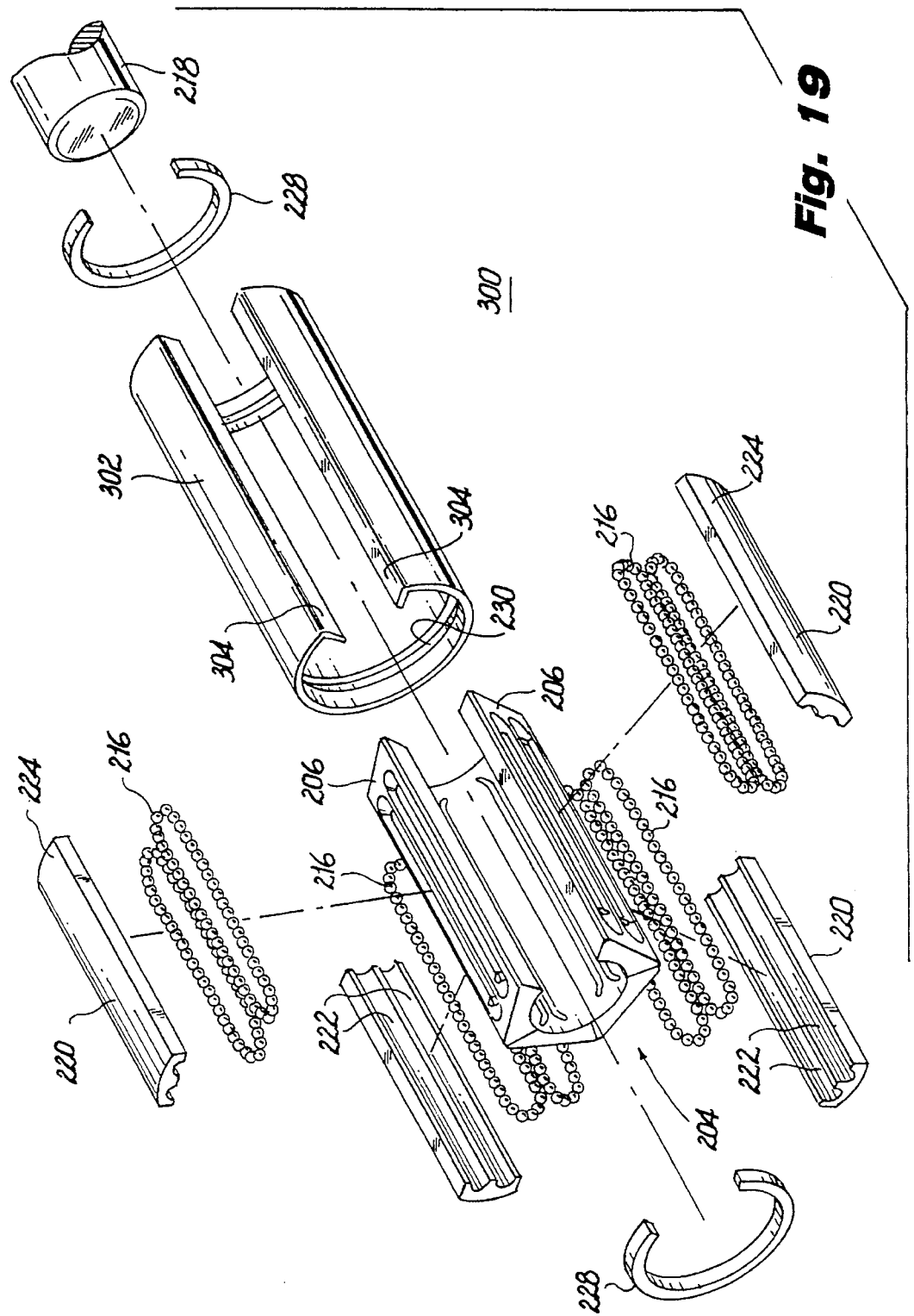
FIG. 19 is an exploded perspective view of an open-type linear motion bearing assembly in accordance with another preferred embodiment of the present invention.
Figure 20:
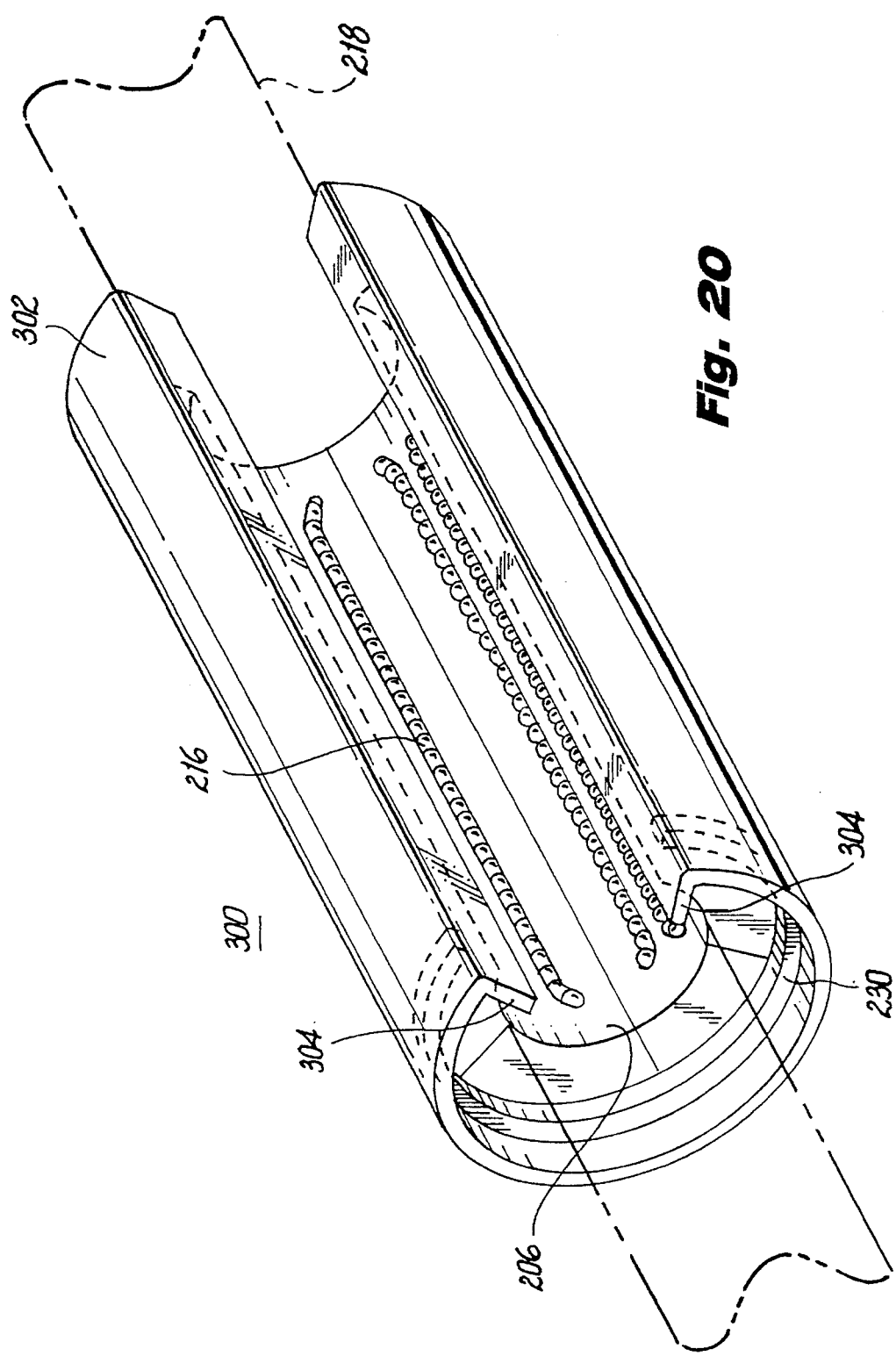
FIG. 20 is a perspective view in partial cross-section of the linear motion bearing assembly of FIG. 19 in an assembled configuration.

Turning now to FIGS. 19 and 20, an open-type linear motion bearing assembly 300 incorporating an extended plate retainer structure 302 is shown. In contrast to the closed-type embodiment shown in FIGS. 13–18, the open-type linear motion bearing assembly 300 requires a modified extended plate retainer structure 302 including a longitudinally extending opening formed therein. Transverse flanges 304 are formed along this opening to assist in retaining the individual ball retainer elements therewithin. Other than this specific change, the balance of the open-type linear motion bearing 300 is substantially the same as the closed-type bearing shown in FIGS. 13–18. The ball retainer assembly 204 remains pentagonally shaped, however one face is removed to provide for the opening in the linear motion bearing assembly.

This linear motion bearing design is efficiently and easily assembled using a novel process. In one embodiment, the process includes the step of providing either a monolithic ball retainer assembly (FIG. 16) or, alternatively, a plurality of individual ball retainer elements (FIG. 15) loaded with balls 216 and load bearing plates 220. For clarity, the assembly process will be described herein with reference to a ball retainer assembly made up of individual ball retainer elements. Once the ball retainer elements 206 are fully assembled with balls 216 and load bearing plates 220, they are positioned, either simultaneously or sequentially into the extended plate retainer structure 202. Preferably, one end containment element 228 is fixed in place prior to insertion of the ball retainer elements 206. Also, a central fixture such as, for example, a shaft or rail, may be positioned within the extended plate retainer structure 202 to facilitate accurate placement of the ball retainer elements 206. In this manner, the linear motion bearing assembly 200 can be positioned vertically or substantially vertically to ease assembly.

After all of the assembled ball retainer elements 206 are in position within the extended plate retainer structure 220, the remaining end containment element 228 is set in place and the bearing assembly 200 is ready for use. Optionally, a seal 232 may be installed at either longitudinal end of the extended plate retainer structure 202 to protect the bearing assembly from ambient contamination.

To the extent not already indicated, it also will be understood by those of ordinary skill in the art that any one of the various specific embodiments herein described and illustrated may be further modified to incorporate features shown in the other specific embodiments.

The invention in its broader aspects therefore is not limited to the specific embodiments herein shown and described but departures may be made therefrom within the scope of the accompanying claims without departing from the principles of the invention and without sacrificing its chief advantages.

We claim:

1. A linear motion bearing assembly for movement along a shaft comprising:

ball retainer structure having at least a portion of a plurality of open axial ball tracks formed therein, said ball tracks including an open load bearing portion, an open return portion and turnarounds interconnecting said load bearing and return portions;

a plurality of bearing balls disposed in said ball tracks;

a plurality of load bearing plates axially positioned adjacent said ball retainer structure for receiving load from said balls disposed in said load bearing portion of the ball tracks; and an extended plate retainer structure enclosing substantially all of an exposed exterior surface of said ball retainer structure and having a uniform substantially cylindrical inner surface in direct contact with said load bearing plates, said extended plate retainer structure being configured and dimensioned to maintain said plurality of load bearing plates in position and for receiving load directly from said load bearing plates.

2. A linear motion bearing assembly as in claim 1, wherein said ball retainer structure is monolithically formed.

3. A linear motion bearing assembly as in claim 1, wherein said extended plate retainer structure is fabricated from an engineering material selected from the group consisting of steel, aluminum, and plastic.

4. A linear motion bearing assembly as in claim 1, further comprising a pair of end seals positioned adjacent longitudinal ends of said extended plate retainer structure.

5. A linear motion bearing assembly for movement along a shaft comprising:

ball retainer structure having a plurality of planar outer surfaces, each planar outer surface having at least one open axial ball track formed therein, the ball tracks each including an open load bearing portion, an open return portion and a pair of turnarounds interconnecting the load bearing and return portions;

a plurality of bearing balls disposed in the ball tracks;

a plurality of load bearing plates axially positioned adjacent the ball retainer structure for receiving load from the balls disposed in the load bearing portion of the ball tracks; and an extended plate retainer structure enclosing substantially all of the planar outer surfaces of the ball retainer structure and having a uniform substantially cylindrical inner surface in direct contact with the load bearing plates, the extended plate retainer structure being configured and dimensioned to maintain the plurality of load bearing plates in position and for receiving load directly from the load bearing plates.

6. A linear motion bearing assembly as in claim 5 wherein the ball retainer structure is monolithically formed.

7. A linear motion bearing assembly as in claim 5 wherein each planar outer surface of the ball retainer structure includes a pair of open axial ball tracks formed therein.

8. A linear motion bearing assembly as in claim 7 wherein the pair of open axial ball tracks are arranged in parallel along a common longitudinal axis.

9. A linear motion bearing assembly as in claim 8 wherein the respective load bearing portions of the pair of open axial ball tracks are arranged in side by side relation.

10. A linear motion bearing assembly as in claim 9 wherein each of the plurality of load bearing plates overlie the side by side load bearing portions of the pair of open axial ball tracks.

11. A linear motion bearing assembly as in claim 5 further comprising end containment elements for containing the ball retainer structure within the extended plate retainer structure.

12. A linear motion bearing assembly as in claim 11 wherein the end containment elements are C-rings.

13. A linear motion bearing assembly as in claim 5 further comprising a pair of end seals positioned adjacent longitudinal ends of the extended plate retainer structure.

14. A linear motion bearing assembly as in claim 5 wherein the bearing assembly is of an open type.

15. A linear motion bearing assembly for movement along a shaft comprising:

ball retainer structure including a plurality of ball retainer segments, each of the ball retainer segments having a substantially planar outer surface and at least one open axial ball track formed therein, the ball tracks each including an open load bearing portion and an open return portion and a pair of turnarounds interconnecting the load bearing and return portions;

a plurality of bearing balls disposed in the ball tracks;

a plurality of load bearing plates axially positioned adjacent the ball retainer structure for receiving load from the balls disposed in the load bearing portion of the ball tracks; and an extended plate retainer structure enclosing substantially all of the planar outer surfaces of the ball retainer segments and having a uniform substantially cylindrical inner surface in direct contact with the load bearing plates, the extended plate retainer structure being configured and dimensioned to maintain the plurality of load bearing plates in position and for receiving load directly from the load bearing plates.

16. A linear motion bearing assembly as in claim 15 wherein each planar outer surface of the ball retainer segments includes a pair of open axial ball tracks formed therein.

17. A linear motion bearing assembly as in claim 16 wherein the pair of open axial ball tracks are arranged in parallel along a common longitudinal axis.

18. A linear motion bearing assembly as in claim 17 wherein the respective load bearing portions of the pair of open axial ball tracks are arranged in side by side relation.

19. A linear motion bearing assembly as in claim 18 wherein each of the plurality of load bearing plates overlie the side by side load bearing portions of the pair of open axial ball tracks.

20. A linear motion bearing assembly as in claim 15 further comprising end containment elements for containing the ball retainer segments within the extended plate retainer structure.

21. A linear motion bearing assembly as in claim 20 wherein the end containment elements are C-rings.

22. A linear motion bearing assembly as in claim 15 further comprising a pair of end seals positioned adjacent longitudinal ends of the extended plate retainer structure.

23. A linear motion bearing assembly as in claim 15 wherein the bearing assembly is of an open type.

\* \* \* \* \*